Figure 1:
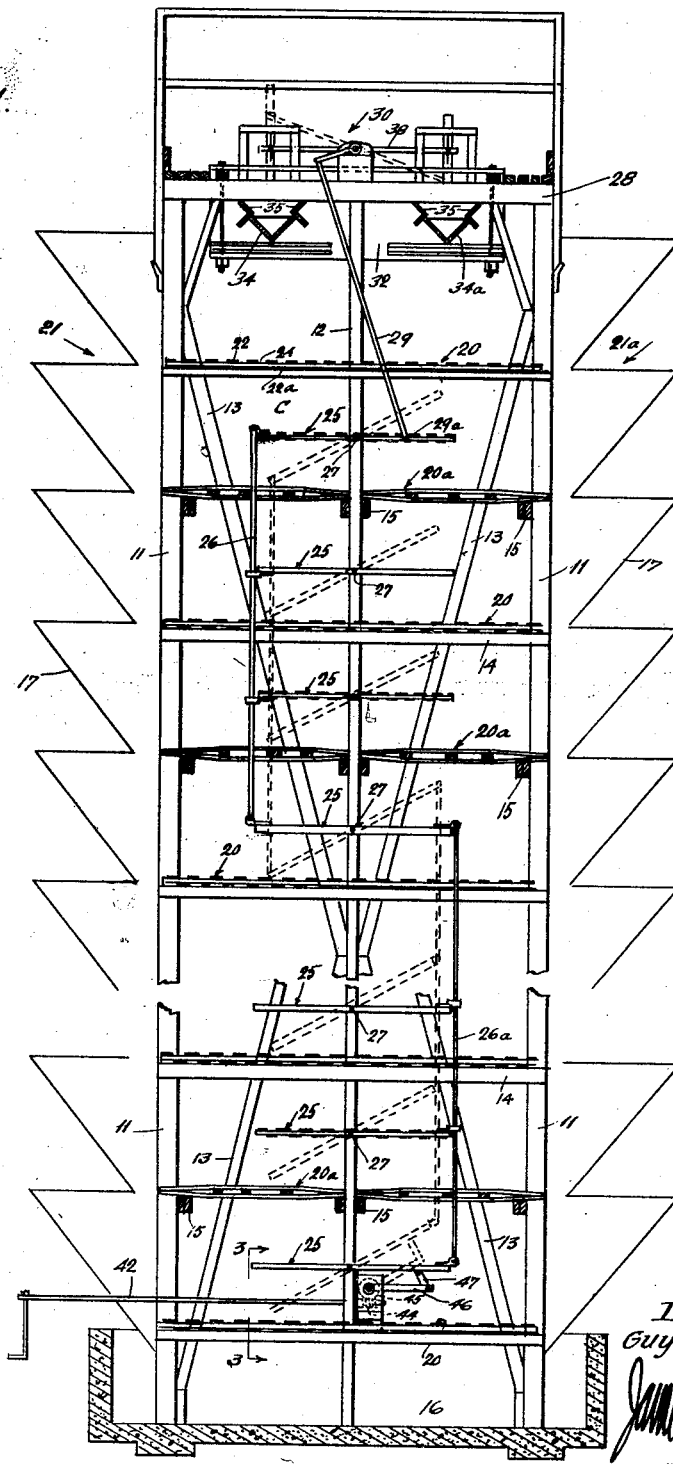

Dec. 23, 1930.  G. T. MARTIN  1,786,076
ATMOSPHERIC COOLING TOWER
Filed July 2, 1928  3 Sheets-Sheet 1

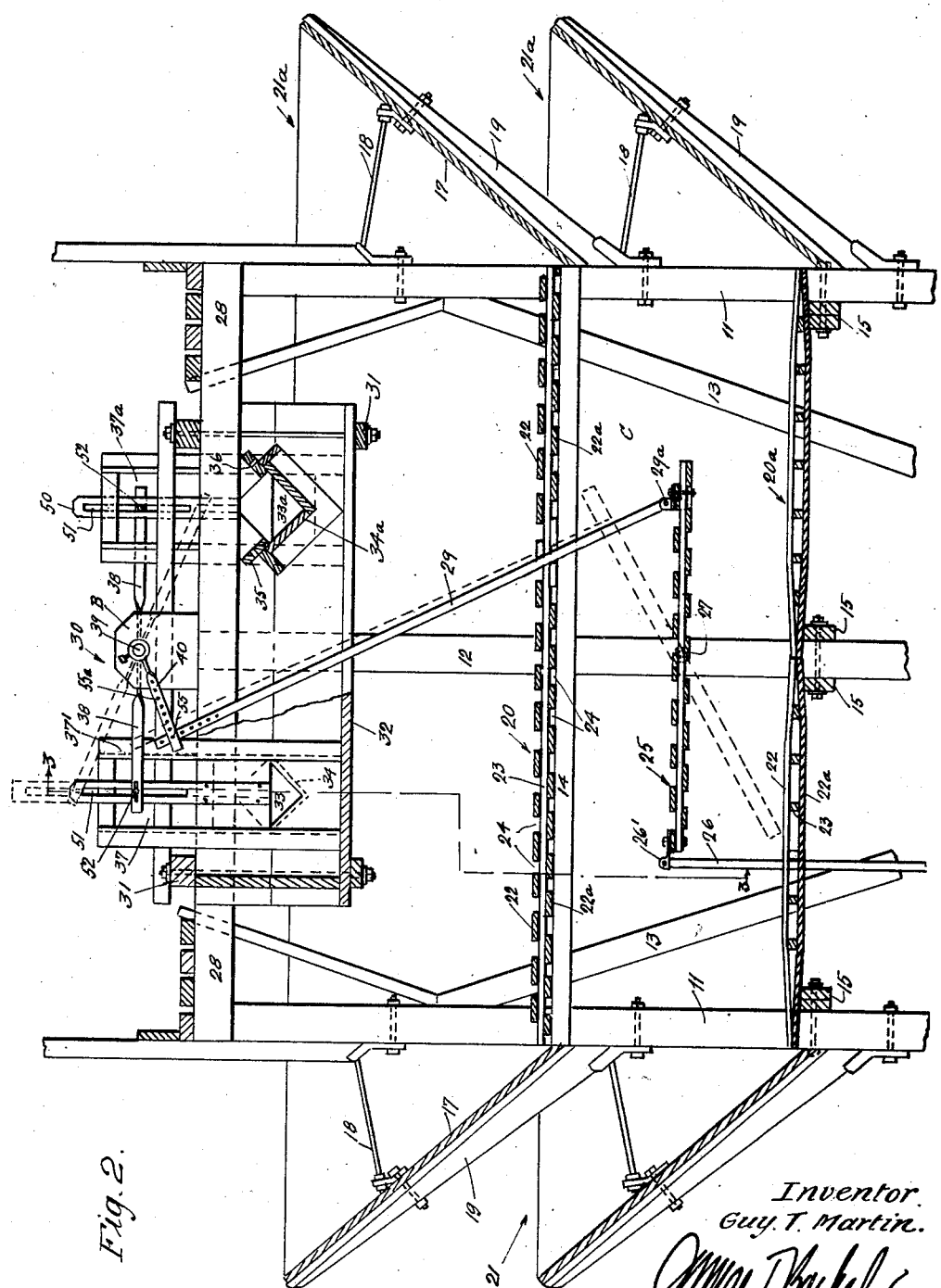

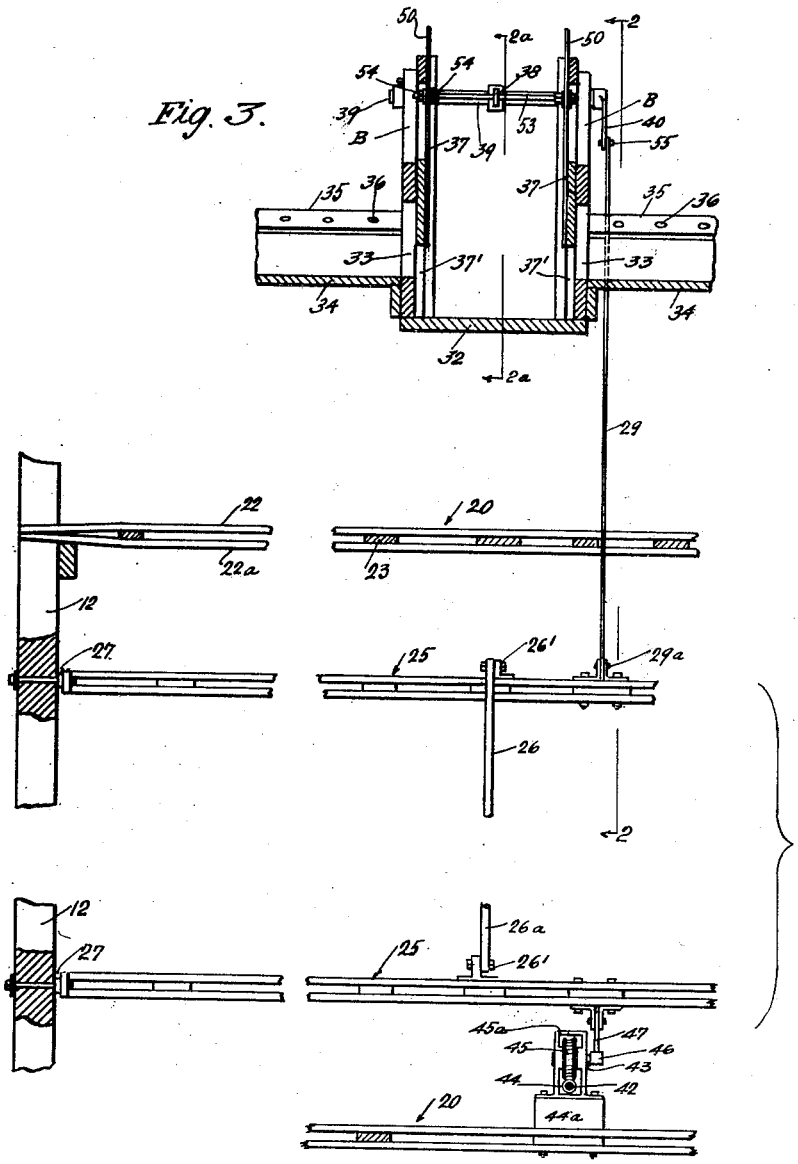

Patented Dec. 23, 1930

1,786,076

UNITED STATES PATENT OFFICE

GUY T. MARTIN, OF LOS ANGELES, CALIFORNIA, ASSIGNOR TO FLUOR CONSTRUCTION CO., OF LOS ANGELES, CALIFORNIA, A CORPORATION OF CALIFORNIA

ATMOSPHERIC COOLING TOWER

Application filed July 2, 1928. Serial No. 290,005.

This invention has to do generally with liquid distributing systems for use in atmospheric cooling towers.

An atmospheric cooling tower, as generally constructed, includes a series of vertically-spaced and apertured decks, usually horizontal, and louver boards which incline upwardly and outwardly from near the edges of the decks. Air passes to and from the interior of the tower through substantially horizontal louver openings defined by the said louver boards. Liquid is delivered over the uppermost deck of the tower and permitted to flow downward through the series of apertured decks. The liquid is cooled as it is brought into intimate contact with transversely flowing air currents, the liquid falling, in drop form, through the chambers between the decks, and it is also cooled as it becomes exposed to said currents in spreading over slats or members which are usually specially arranged to form the decks. The cooled liquid is discharged into a basin at the tower base.

During periods of light or moderate wind velocity, excessive loss of liquid from the tower is prevented by the louver boards. In the event of high winds, however, sufficient liquid may be carried by the wind through the louvers to constitute serious liquid loss unless provision is made for counteracting the effects of such winds. Furthermore, the tower efficiency is decreased at such times due to the leeward side of the tower being over-supplied with liquid blown from the windward side. In a co-pending application entitled "Atmospheric cooling tower," filed by me on August 6, 1927, Serial Number 211,019, I have explained a system of baffles or tilting decks, disposed within the chambers between adjacent tower decks, which system was devised for such a counter-acting purpose. In some of its phrases, the present invention contemplates the use of this system but incorporates therewith means for controlling the flow of liquid from the distributing system to the tower compartments, whereby during windy weather, the liquid loss and efficiency loss of the tower is still further lessened. However, considered in its broader aspects, it will be understood, the invention is not limited to the precise system of baffles disclosed in said co-pending application, nor, in all its phases, is it limited to the provision of any baffle system.

Generally, I accomplish the desired end by the delivery of an increased flow of liquid towards the windward side of the tower, coincidently reducing the flow of liquid delivered to the leeward side. The result of this action is that excessive wind velocities within the tower act against the heavier body of falling liquid at the windward side, sweeping part of it toward the leeward side, but not out of the tower and, in effect, distributes the whole mass of falling liquid substantially evenly from side to side.

An additional purpose of this invention is to provide means for the simultaneous operation of the control valves of said delivery system and of said baffle system. Due to the sympathetic characteristics of operation of said baffle and delivery systems, it is desirable, though not essential, that each be actuated from the same control mechanism.

A further object of my invention is to provide a simple, efficient means for operating said valves and baffles from a convenient position, preferably, though not necessarily, a position near the ground level at the cooling tower base.

Additional objects and advantages of my invention are disclosed in the following detailed description in which reference is made to the following drawings:

Fig. 1 is a diagrammatic elevation of my invention, suitably disposed within an atmospheric cooling tower;

Fig. 2 is a fragmentary section on line 2—2 of Fig. 3, the broken-away section of the left-hand side of the distributing box being taken on line 2a—2a of Fig. 3; and Fig. 3 is a composite section on line 3—3 of Fig. 2, and on line 3—3 of Fig. 1, that portion of the section taken from Fig. 1 being enlarged to agree with the scale of Fig. 2.

For purposes of explanation, the drawings and specification are illustrative and descriptive of a representative type of atmospheric cooling tower. However, it is understood that certain tower structural features are incidental to the essence of my invention and that numerous variations of said features are permissible without departure from the scope of said invention. Furthermore, while I have shown herein a single, self-contained tower unit, a tower for use in a commercial installation often includes a series of such units, joined end to end, in which event end louvers are required only on the outer extremities of the end units of the series.

The cooling tower framework is composed of corner posts 11, center end posts 12, diagonal braces 13, horizontal headers 14 extending substantially at right angles to headers 15, each serving as deck supports, and crown structure 28. Footing for the tower is made in collecting basin 16.

Louver boards 17 are supported in upwardly and outwardly inclined positions by means of tension rods 18 and braces 19 secured to posts 11 and 12, the lower edges of the boards being substantially opposite the decks 20. By so arranging the louver boards, wind currents are caused to flow into the tower through the windward openings 21, thence downwardly, then horizontally through the chambers C, individually vertically defined by each pair of adjacent decks (for instance, decks 20 and 20a), and finally are deflected upwardly and outwardly through leeward louver openings 21a.

The deck assemblies 20, preferably, but not necessarily, extend horizontally, and are constructed in a manner suitable for providing proper surface for contact with the downflowing liquid. For instance, deck 20 is constructed of a series of vertically spaced members or slats 22 and 22a, horizontally staggered with respect to each other to leave staggered openings 24, and spaced vertically by means of transverse members 23, so the downflowing liquid is thoroughly exposed to the air in spreading over members 22 and 22a as it flows through the deck. Adjacent deck assemblies may have their slat members arranged angularly, as is clearly shown in Fig. 2, to the end that the breaking-up and spreading of the liquid mass may be more completely accomplished.

Supported within each compartment C is a tiltable or oscillatory baffle, preferably, though not necessarily, centrally pivoted at 27 to posts 12. These baffles may be of any desired width but preferably are substantially equal in length to the distance between center columns. The structure of the individual baffles 25 may be similar to that of a typical deck 20, and therefore are given similar reference numerals. Fig. 2 shows corresponding members of baffle 25 and deck 20 substantially parallel.

During high winds, the baffles 25 are tilted downward toward the windward side of the cooling tower and in being so positioned the incoming air currents are deflected from their direct horizontal paths, a baffle effect thus being given which breaks up and deflects the currents, preventing them from sweeping the dropping fluid from side to side of the compartment. The degree of inclination given the baffles is varied to meet varying conditions; that is the higher the wind, the greater the degree of inclination given to the baffles. Furthermore, the tilting deck has directional characteristics as far as the dropping fluid is concerned, for its inclination is such that it tends to direct the fluid toward that side of the compartment from which it is being wind-driven.

The slotted or apertured nature of the tilting decks also renders them useful in the same manner as the stationary decks, that is, they serve to break up and spread the dropping fluid, the decks having this function whether they be held horizontally during relatively calm weather or be inclined during relatively windy weather. It is evident that at times of low or moderate wind velocities, when the baffles are preferably in horizontal position, that said baffles expose additional and desirable deck surface to the downward falling liquid.

While any suitable mechanism may be employed to rotate the baffles, I have illustrated a means which is preferable due to its simplicity and efficiency. Adjusting links or rods 26 and 26a are pivotally connected at 26' to the ends of the decks, the rods being of substantially equal weight and being located at opposite sides of and equally spaced from pivots 27, thereby effecting a balance in the combined torque about the combined pivots 27.

Without going further, at this point, into the baffle-moving mechanism, I will now describe my improved liquid delivery system 30 which preferably operates in conjunction with the baffles.

This system is utilized for the proper introduction of liquid to the cooling tower and is supported on crown structure 28. It includes a framework 31 from which is suspended a central liquid supply conduit or distributor box 32, this box extending crosswise of the tower and having any convenient length. In the sides of said distributor box are openings 33 and 33a which communicate with troughs 34 and 34a, respectively. The troughs may be V-shaped and extend normally from the distributor box to the ends of the tower. Troughs 34 and 34a are arranged at opposite sides of the tower and have diagonally upward extensions 35 at their upper edges, the extensions being provided with suitably spaced openings 36 through which liquid overflows. Vertically movable gates or valves 37 and 37a, guided in ways 37', are provided for regulating the flow of liquid from the interior of box 32 to troughs 34 and 34a, respectively. A rock shaft 39 is mounted for oscillation on journal blocks B midway between the troughs.

Since each trough 34 and 34a extends from opposite sides of the distributor box, it follows that openings 33, 33a and gates 37 and 37a must be provided in duplicate. Each gate is provided with an upward, central extension 50 which is vertically slotted at 51. A lever 38 is centrally connected to rock shaft 39 and its opposite ends have lost-motion connection at 52 with cross rods 53 which extend between and are adjustably connected to the extensions 50 of each pair of companion gates. It follows that oscillation of shaft 39 causes opposite vertical movement of the gates, that is, when one is being moved toward open position, the other is being moved toward closed position. Thus adjustment of one gate to increase the flow to one trough results in a simultaneous reduction in flow to the other trough. The connections between rods 53 and extensions 50 are made by extending the rods through slots 51 and then threading jam nuts 54 along the rods into clamping engagement with opposite sides of the extension. It will be seen, however, that gates 37 and 37a may be adjusted vertically and independently by loosening nuts 54, so, with lever 38 extending horizontally, the effective sizes of openings 33 and 33a are different. Such adjustment may be made when, due to prevailing weather conditions, it is prevailingly desirable that more liquid be delivered to one side of the tower than to the other.

A change in wind conditions which calls for a shift in the positions of the movable baffles should be accompanied by a corresponding adjustment of the liquid distributing means. That is, assuming that it be desirable to tilt deck 25 in Fig. 2 to dotted line position to counteract the effect of air currents entering corresponding opening 21, it is desirable that gate 37 be simultaneously opened further to deliver more liquid to the windward side of the tower and simultaneously partially or wholly close down gate 37a to reduce or stop the flow of liquid to the leeward side. Accordingly, I have provided an interconnection between the baffles and rock shaft 39 whereby this is accomplished.

A crank arm 40 is non-rotatably mounted on shaft 39 and its free end is pivotally connected at 55 to the free end of link or connecting rod 29, the opposite end of said link being pivotally connected at 29a to uppermost baffle 25. The crank arm and rod are provided with a plurality of adjustment holes 55a whereby connection 55 may be made at different points to vary the length of the stroke of lever 38 (and hence of the gates) with a given angular movement of the baffle. The link crosses the line of centers of shaft 39 and pivots 27, it following that counterclockwise rotation of the baffle causes clockwise rotation of crank 40 and lever 38 (and vice versa) the gate at the windward side of the tower thereby being opened further by virtue of the baffle being moved in a manner to offset the effects of incoming air currents. At the same time the gate at the leeward side of the tower is correspondingly moved downwardly to decrease the liquid flow from the associated lateral.

In Figs. 1 and 3 I have illustrated unitary means whereby the baffles and gates may be shifted simultaneously and held releasably in adjusted position. It will be understood, however, that this showing is merely illustrative of and not restrictive on the invention, considered in its broader aspects. Furthermore, while it is a great convenience to interconnect the baffles and gates so the power operating the gates is transmitted to said gates through the baffles, my invention, considered in one aspect, broadly contemplates the application of baffle and gate operating power from a single source, irrespective of the points of application of said power.

The illustrated baffle and gate adjusting means includes a power shaft 42 adapted to be rotated manually or by machine from a point outside the tower, said shaft carrying a worm 44 which meshes with worm wheel 45. Wheel 45 is on rock shaft 43 which is journaled in a frame 45a mounted on a base 44a supported on the lowermost stationary deck. Shaft 43 carries crank arm 46 which is pivotally connected through link 47 to the lowermost baffle 25. It will be evident that oscillation of shaft 43 (through oscillation of the power shaft) serves to oscillate said lowermost baffle about its pivots 27, and that through rods 26 and 29 these oscillations are simultaneously imparted to all the baffles and to lever 38, to the advantageous ends mentioned above.

It will be evident that since the baffles are balanced on pivots 27 and links 26 counterbalance one another, as do also gates 37, 37a, that little power is needed to shift them, and that they have a tendency to remain in adjusted position. Moreover, worm 44 and worm wheel 45 preferably are of such pitch that they have self-locking characteristics, so, when the baffles and gates are moved to selected positions, said worms hold them releasably in such positions.

It will be seen that power shaft 42 may be considered as an actuator or remote control means for the valve mechanism, as a baffle moving means, or as unitary means for simultaneously controlling the selective discharge of liquid at different points over the cooling chamber and for operating means controlling the passage of air currents through the tower.

The convenience resulting from my invention can readily be appreciated from the fact that by a single operation at a convenient and accessible location, an operator is able simultaneously to make a number of necessary adjustments substantially throughout the entire cooling tower. Furthermore, due to the cooperation, both in action and effect, between the various members of this distributing system, it is evident that efficiency and economy in operation are accomplished. Other advantages will be evident to those skilled in the art.

It will be understood the drawings and description are to be considered merely as illustrative of and not restrictive on the broader claims appended hereto, for various changes in design, structure and arrangements may be made without departing from the spirit and scope of said claims.

I claim:

1. In an atmospheric cooling tower having an interior cooling chamber through which air currents are adapted to pass, a liquid distributing system associated with the chamber and having delivery means whereby liquid is discharged so as to fall through said chamber, valve means operable to control the discharge of liquid from said system, means operable to control the passage of air currents through said chamber, and unitary means for simultaneously operating said valve means and said air passage control means.

2. In an atmospheric cooling tower having an interior cooling chamber through which air currents are adapted to pass, a liquid distributing system associated with the chamber and having delivery means whereby liquid is discharged so as to fall through said chamber, said delivery means being selectively controllable to discharge the liquid at different points over the chamber, means operable to control the passage of air currents through said chamber, and unitary means for simultaneously controlling said delivery means and operating the air-passage control means.

3. In an atmospheric cooling tower having an interior cooling chamber through which air currents are adapted to pass, a liquid distributing system associated with the chamber and having delivery means whereby liquid is discharged so as to fall through said chamber, valve means operable to control the discharge of liquid from said system, an apertured baffle positioned substantially in the path of fall of the liquid and operable to control the passage of air currents through said chamber, and unitary means for simultaneously operating the valve means and baffle.

4. In an atmospheric cooling tower having an interior cooling chamber through which air currents are adapted to pass, a liquid distributing system associated with the chamber and having delivery means whereby liquid is discharged so as to fall through said chamber, valve means operable to control the discharge of liquid from said system, a baffle associated with the chamber and mounted for pivotal movement to alter its effective position with respect to incoming air currents, and unitary means for operating said valve means and pivotally moving said baffle.

5. In an atmospheric cooling tower having an interior cooling chamber through which air currents are adapted to pass, a liquid distributing system associated with the chamber and having delivery means whereby liquid is discharged so as to fall through said chamber, valve means operable to control the discharge of liquid from said system, an apertured baffle within the chamber, said baffle being located substantially in the path of fall of the liquid and mounted for pivotal movement to alter its effective position with respect to incoming air currents, and unitary means for operating the valve means and pivotally moving said baffle.

6. In an atmospheric cooling tower having an interior cooling chamber through which air currents are adapted to pass substantially horizontally, a liquid distributing system associated with the chamber and having delivery means whereby liquid is discharged so as to fall through said chamber, valve means in the system operable to control the liquid discharge, a baffle in the chamber and movable to alter its effective position with respect to incoming air currents, and an interconnection between said valve means and the baffle whereby movement of said baffle operates the valve means.

7. In an atmospheric cooling tower having an interior louver-walled cooling chamber through which air currents are adapted to pass, a liquid distributing system associated with the chamber and having delivery means whereby liquid is discharged so as to fall through said chamber, said delivery means being selectively controllable to discharge the liquid at different points over the chamber, and means exclusive of the chamber louver wall and spaced therefrom, operable to control the passage of air currents through said chamber.

8. In an atmospheric cooling tower having an interior cooling chamber through which air currents are adapted to pass substantially horizontally, a liquid distributing system associated with the chamber and having delivery means whereby liquid is discharged so as to fall through said chamber, a pair of valves in the system operable to control the liquid discharge, a baffle in the chamber and movable to alter its effective position with respect to incoming air currents, and an interconnection between the valve means and baffle whereby movement of said baffle moves one of the valves towards open position and the other valve towards closed position.

9. In an atmospheric cooling tower having an interior cooling chamber through which air currents are adapted to pass, a liquid distributing system associated with the chamber and having delivery means whereby liquid is discharged so as to fall through said chamber, a pair of valves operable to control the discharge of liquid from said system, means operable to control the passage of air currents through said chamber, and unitary means for operating the passage-control means, for moving one of the valves towards open position and simultaneously moving the other valve towards closed position.

10. In an atmospheric cooling tower having an interior cooling chamber through which air currents are adapted to pass, a liquid supply conduit, a distributing lateral communicating with the conduit and positioned to discharge liquid therefrom so said liquid falls through the chamber, a gate valve movable vertically to vary the effective flow of liquid from the conduit to the lateral, a baffle associated with the chamber and mounted for pivotal movement to alter its effective position with respect to incoming air currents, means for moving the baffle pivotally, and a connection between the baffle and said gate valve whereby pivotal movement of the baffle moves the gate valve vertically.

11. In an atmospheric cooling tower having an interior cooling chamber through which air currents are adapted to pass, a liquid supply conduit, a pair of distributing laterals communicating with the conduit and positioned to discharge liquid therefrom so said liquid falls through the chamber, a pair of gate valves, one for each lateral, movable vertically to vary the effective flow of liquid from the conduit to the associated laterals, a baffle associated with the chamber and mounted for pivotal movement to alter its effective position with respect to incoming air currents, means for moving the baffle pivotally, and a connection between the baffle and gate valves whereby pivotal movement of the baffle moves the gate valves vertically and oppositely.

12. In an atmospheric cooling tower having a vertically arranged series of cooling chambers, the chambers being individually vertically defined by spaced upper and lower decks through which liquid from above is adapted to fall, a plurality of baffles, one in each of several of the chambers, said baffles being individually mounted centrally for movement about a horizontal axis, and a plurality of tie rods connecting said baffles and movable longitudinally to cause simultaneous pivotal movement of the baffles, said rods being disposed in balanced arrangement at opposite sides of the central pivotal mounting of the baffles.

13. In an atmospheric cooling tower having an interior cooling chamber through which air currents are adapted to pass, a liquid supply conduit, a pair of distributing laterals communicating with the conduit and positioned to discharge liquid therefrom so said liquid falls through the chamber, a pair of valves associated one each with the laterals to control the flow thereto from the conduit, and means interconnecting the valves whereby one is moved toward closed position by virtue of movement of the other toward open position.

14. In an atmospheric cooling tower having an interior cooling chamber through which air currents are adapted to pass, a liquid supply conduit, a pair of distributing laterals communicating with the conduit and positioned to discharge liquid therefrom so said liquid falls through the chamber, a pair of valves associated one each with the laterals to control the flow thereto from the conduit, and means interconnecting the valves whereby one is moved toward closed position by virtue of movement of the other toward open position, said valves being independently adjustable.

In witness that I claim the foregoing I have hereunto subscribed my name this 22d day of June 1928.

GUY T. MARTIN.